Dec. 11, 1962   D. R. DELLINGER   3,068,406
SUPPRESSED ZERO FREQUENCY METER
Filed June 18, 1959
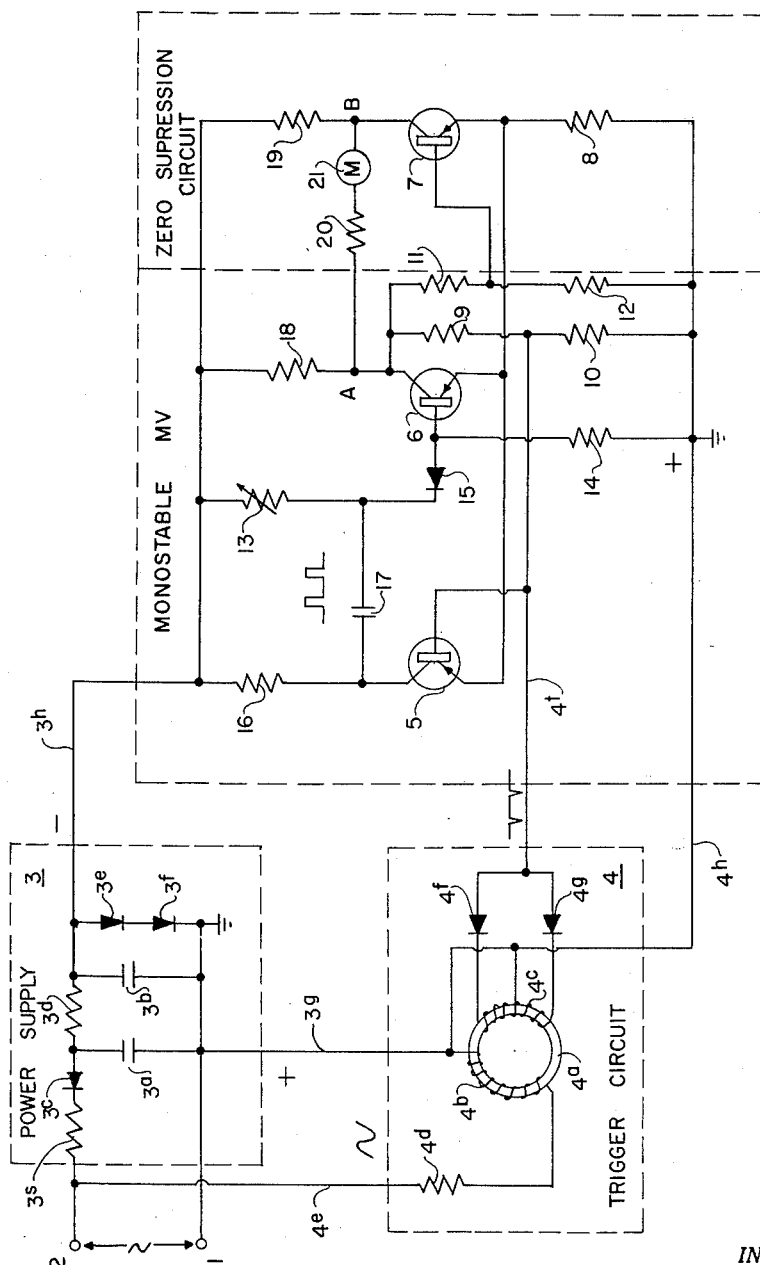
INVENTOR.
DAREL R. DELLINGER
BY
Alexander & Dowell

United States Patent Office 3,068,406
Patented Dec. 11, 1962

3,068,406
SUPPRESSED ZERO FREQUENCY METER
Darel R. Dellinger, Alexandria, Va., assignor to American Machine & Foundry Company, a corporation of New Jersey
Filed June 18, 1959, Ser. No. 821,296
8 Claims. (Cl. 324—78)

This invention relates to suppressed-zero frequency meters, and more particularly relates to improvements in measuring circuitry whereby a relatively simple multivibrator and electronic bridge circuit provide very accurate frequency readings.

It is a principal object of this invention to provide a circuit which accurately measures frequency and is relatively insensitive to sizable changes in amplitude and harmonic content of the input signal being measured, and which remains accurate over a wide range of ambient temperatures.

It is another major object of this invention to provide an electronic circuit which is self-powered by the wave whose frequency is being measured and which changes the input wave form into uniform pulses which are applied to a novel circuit having electronic valves in two legs of a bridge, one valve being driven to saturation and the other valve being cut off each time a pulse passes. It is an important feature that this bridge circuit measures only the duty cycle of the conductivities of the two valves, as distinguished from quantitatively measuring amplitudes of the currents flowing through the valves.

Still another important object of the invention is to provide a frequency meter circuit having a suppressed-zero feature including means for providing a reverse signal suitable to cause the average current flow through the indicating meter to equal zero at a selected input frequency, which frequency is located at the lower end of the calibrated scale of frequencies which the meter is capable of indicating.

Other objects and advantages of the present circuit will become apparent during the following discussion of the drawing, wherein:

The drawing is a schematic representation of a complete suppressed-zero frequency meter according to the present invention. Referring now to the drawing, the input to the present meter circuit comprises terminals 1 and 2, the former representing a common terminal which may be grounded to the chassis of the circuit if desired. These terminals are connected with a power supply unit 3 which includes two filter condensers 3a and 3b, a rectifier diode 3c, and a resistance 3d connected between the capacitors 3a and 3b. The filtered D.C. voltage at the output of the power supply is regulated to a desired constant value by two Zener diodes 3e and 3f which serve a function well known in the prior art. The output of the power supply 3 appears between the ground terminal wire 3g and the wire 3h which in the present circuit comprises the minus terminal of the power supply in view of the fact that PNP transistors are employed in the embodiment illustrated. The resistance 3s limits the amount of current through the diode 3c and thereby serves as a protection therefor.

The actual measuring circuit is preceded by a trigger circuit 4 comprising a small saturable reactor including a core 4a, a primary winding 4b and a secondary winding 4c. The secondary winding has a center tap which is connected to terminal 1 by the wire 3g and also connected to one side of the primary winding 4b. A current-limiting resistor 4d is inserted in series with the other side of the primary winding 4b and in the lead 4e which is connected with terminal No. 2, the current-limiting resistor 4d serving to limit the current through the primary winding 4b after the core saturates on each half cycle of the wave impressed across the terminals 1 and 2. The ends of the secondary winding 4c are connected to two diodes 4f and 4g which serve as rectifiers for the purpose of erecting the output pulses from the secondary winding 4c of the saturable reactor so that all of the pulses have the same polarity, namely negative polarity as shown in the sketch. These negative output pulses appear on the trigger lead 4t, and the ground return from the trigger circuit to the measuring circuit is made through the wire 4h.

The negative trigger pulses are fed to a monostable multivibrator comprising transistors 5 and 6, these transistors being connected in a circuit such that in the absence of an input pulse the transistor 5 is nonconductive while the transistor 6 is forwardly biased to saturation. The zero-suppression circuit also includes a transistor 7 which is biased to cut off in the manner to be hereinafter explained. The emitters of the three transistors just mentioned are all connected together and are returned to the positive ground terminal by way of a biasing resistor 8. As stated above, the transistors 5 and 7 are normally nonconductive, and therefore the emitter current through the transistor 6 through the resistance 8 is made large enough to provide a drop across the resistance sufficient to maintain transistors 5 and 7 nonconductive. Resistances 9 and 10 comprise a voltage divider for establishing a normal D.C. level on the base of the transistor 5, and this level is sufficiently positive that the transistor 5 remains nonconductive. Another voltage divider including resistances 11 and 12 normally maintains the base of transistor 7 at such a D.C. level that the voltage appearing across the resistance 8 can maintain the transistor 7 nonconductive.

On the other hand, the resistances 13 and 14 comprise a voltage divider by which the D.C. level applied to the base of the transistor 6 normally maintains that transistor forwardly biased to saturation, and the diode 15 is oriented in such a direction as to permit the flow of forward bias from the negative lead 3h of the power supply through the resistance 13 into the base of the transistor 6. The resistance 13 is made adjustable for the purpose to be hereinafter explained.

As stated above, the transistor 5 is normally cut off and therefore the collector terminal of that transistor remains substantially at the negative level at the power supply lead 3h. However, whenever a negative pulse is applied to the base of the transistor 5 this transistor is thereby strongly biased in the forward direction and is rendered conductive so that it draws saturation current through its load resistor 16 and thereby drives the collector terminal of the transistor 5 in a positive direction and thus delivers a positive pulse through the condenser 17 and interrupts the flow of negative bias through the diode 15 to the base of the transistor 6. Upon the delivering of each positive pulse through the condenser 17, the transistor 6 is cut off and remains cut off until the positive charge on the condenser 17 leaks off through the time constant of the condenser 17 with the resistance 13. The latter resistance is made adjustable so that the duration of the time constant can be altered for the purpose of changing the duty cycle of the conductivities of the transistors 5 and 6.

The input pulse from the wire 4t to the base of the transistor 5 is short as compared with the time constant of the condenser 17 and resistance 13, and therefore the pulse shape from the trigger circuit as applied to the base of the transistor 5 does not affect the duty cycle of the monostable multivibrator. Whenever the transistor 6 is biased to saturation, the base of the transistor 7 which is connected at the junction point of the resistance voltage divider 11—12 is biased relatively positive with respect to its emitter, with the result that the transistor 7 is cut off. However, when transistor 5 becomes conductive and thereby cuts off transistor 6, the collector of transistor 6 goes strongly negative and a portion of this negative pulse is applied through the resistance divider 11—12 to the base of the transistor 7 so that this transistor is driven to saturation and remains saturated during the entire time that the transistor 6 is cut off. Thus, the transistor 7 is biased by the collector of transistor 6, depending upon the current which the transistor 6 is drawing through its load resistance 18.

The transistor 7 has a load resistance 19 in its collector circuit, but since the transistor 7 is normally cut off, the point B is generally more negative than the point A in view of the fact that the transistor 6 is normally biased forwardly. A D.C. microammeter 21 is connected between the points A and B through a current-limiting resistor 20, and the current which flows through the microammeter 21 is thereby stable when no pulses are received but is altered when pulses are received from the trigger circuit through the lead 4t. The extent to which the meter reading is altered depends upon the rate at which the pulses are received, since the effect of each pulse is exactly the same as the effect of any other pulse.

*Operation*

The two transistors 6 and 7 can be thought of as D.C. switches which reverse the flow of current through the meter 21. The transistor 6 is normally conductive and when it is conductive current flows from the negative lead 3h through the resistance 19, through the meter 21, the resistance 20 and the transistor 6, and finally through the resistance 8 to the positive lead 4h.

However, when the multivibrator is pulsed and the transistor 6 becomes nonconductive, the transistor 7 is then rendered conductive and the flow of current through the meter 21 is reversed so that current flows from the negative lead 3h of the power supply through the resistance 18, the resistance 20, the meter 21, the transistor 7 and the resistance 8 to the positive lead 4h. Thus, the direction of flow through the meter depends on which of the transistors 6 or 7 is conductive.

The meter actually reads zero when the current flowing in one direction multiplied by the time of flow is equal to the current flowing in the other direction multiplied by the time of flow, and this condition comprises the lowermost reading of the meter M on the suppressed-zero scale. In other words, the average currents in both directions are equal. However, when the average current flow through the meter is increased in one direction or the other, the meter will read some value different from zero. Thus, the reading the meter is determined by the number of pulses per second supplied from the trigger circuit 4 through the lead 4t to the monostable multivibrator, and by the duty cycle of the multivibrator which is determined by the time constant of the resistance 13 and the capacitor 17.

The diode 15 serves several functions. In the first place, it serves to isolate the input resistance of the transistor 6 from the time constant circuit including the resistance 13 and the capacitor 17 because of the fact that the input resistance of the diode 6 is extremely sensitive to temperature. The diode 15 decouples the time constant 13—17 from the variations in input resistance of the transistor 6 and thereby increases the stability of the time constant 13—17.

It is also to be noted that since the transistor 5 is driven from cutoff to saturation, the amplitude of the positive pulses supplied to the capacitor 17 is approximately equal to the supply voltage, and thus the supply voltage would be effectively doubled across the base-to-collector circuit of the transistor 6. By inserting the isolation diode 15, the transistor 6 will be protected from the double voltage which would otherwise be impressed across it and might cause damage.

As stated above, the meter measures average current in both directions as the transistors 6 and 7 are respectively driven from cutoff to saturation and vice versa. Therefore the peak values of current flowing in the two different directions through the meter 21 are constant, but the duty cycle changes depending on the time constant 13—17. The resistance 13, or at least a part thereof, is therefore made variable, and changes in the value of this resistance cause changes in the suppressed-zero level, or, as stated otherwise, cause changes in the number of input pulses which must be applied by the trigger circuit 4 to cause reversal of the conductivities of the multivibrator transistors 5 and 6 in order to effect an exact balance in the average value of the current times time alternately flowing in the two opposite directions through the meter 21.

The emitter resistance 8 has a positive temperature coefficient for the purpose of compensating for changes in the conductivities of the transistors 6 and 7 in the bridge circuit due to variations in ambient and operating temperatures.

The following table sets forth circuit component values comprising one practical embodiment supplied for the purpose of permitting a person skilled in the art to supply and use the invention, but these values not in any way limiting the present invention.

| | |
|---|---|
| Resistance 3s | 470 ohms |
| Resistance 3d | 4,000 ohms |
| Resistance 4d | 10,000 ohms |
| Resistance 8 | 50 ohms neg. temp. coefficient |
| Resistance 9 | 10,000 ohms |
| Resistance 10 | 2,200 ohms |
| Resistance 11 | 10,000 ohms |
| Resistance 12 | 2,200 ohms |
| Resistance 13 | 30,000 ohm potentiometer |
| Resistance 14 | 7,500 ohms |
| Resistance 16 | 2,500 ohms |
| Resistance 18 | 1,500 ohms |
| Resistance 19 | 3,000 ohms |
| Resistance 20 | 2,000 ohms |
| Condenser 3a | 1 microfarad |
| Condenser 3b | 5 microfarads |
| Condenser 17 | .05 microfarad |
| Diode 3c | 1N1695 |
| Diode 3e | Zener, Transistron SV-9 |
| Diode 3f | Zener, Transistron SV-7 |
| Transformer core 4a | Magnetics Inc. type 50153-2D primary—50 turns, secondary—120 turns center tapped |
| Transistors 5, 6 and 7 | 2N396 |
| Meter 21 | D.C. microammeter |

I do not limit my invention to the exact form shown in the drawing, for obviously changes may be made therein within the scope of the following claims.

I claim:

1. A frequency meter circuit for measuring the frequency of an input wave, comprising a trigger circuit receiving said wave and delivering at least one trigger pulse for each cycle of the wave; a source of constant D.C. power; a D.C. meter calibrated in terms of frequency; separate impedances connecting both ends of the meter to one side of the D.C. source; a first and a second electronic valve connected respectively in circuits between opposite the ends of the meter and the other side of the D.C. source; a third electronic valve connected to form with the first valve a monostable multivibrator having a time constant determining the interval of time during which the multivibrator will remain in the non-stable condition of conductivity, said multivibrator being connected with the trigger circuit and having its conductivity reversed to the non-stable condition by each trigger pulse, and the multivibrator being connected to control the second valve to a condition of conductivity opposite at all times from that of said first valve, whereby the meter will register the differential between the average current flowing in one direction through the meter when the first valve is conductive and that flowing in the other direction therethrough when the second valve is conductive.

2. In a meter circuit as set forth in claim 1, said multivibrator alternately driving the first and second valves between cut-off and saturation.

3. In a meter circuit as set forth in claim 1, said valves comprising transistors, and said time constant comprising a bias resistance in the base circuit of the first transistor and a coupling capacitor between the collector of the third transistor and the base circuit of the first transistor; and an isolation diode connected from the junction of the resistance and the capacitor to the base of the first transistor, said diode being oriented to isolate the input resistance of the base of the first transistor from the time constant to prevent variations in said input resistance from affecting the stability of the time constant.

4. In a meter circuit as set forth in claim 1, said source of D.C. power comprising rectifier, filter and voltage regulator means connected to receive said wave and to supply direct current to said valves.

5. In a meter circuit as set forth in claim 1, said trigger circuit comprising a transformer having a primary winding connected to receive said wave, and having a secondary winding, and having a core saturable by each cycle of said wave whereby only narrow pulses appear in the secondary winding; and rectifier means connected to said secondary winding to erect said pulses to the same polarity.

6. A frequency meter circuit for measuring the frequency of an input wave, comprising a trigger circuit receiving said wave and delivering at least one trigger pulse for each cycle of the wave; a source of constant D.C. power; a D.C. meter; two impedances respectively connecting opposite ends of the meter to one side of the D.C. source; two electronic valves respectively connected in circuits between opposite ends of the meter and the other side of the D.C. source; means for normally biasing one of the valves to saturation and the other valve to cut-off; a control valve coupled with one of said two valves to form a mono-stable multivibrator having a time constant and coupled with said trigger circuit to be driven by said trigger pulse to an astable state for the duration of said time constant; and control means coupled between the other of said two valves and said multivibrator to reverse the condition of conductivity of said other valve during each interval when the multivibrator is in astable state and thereby reverse the direction of current flow in the meter during each of said intervals.

7. In a circuit as set forth in claim 6, additional impedance means connected in series with one of said valves for unbalancing the peak current flowing in the meter when one valve is saturated as compared with the current flowing in the meter when the other valve is saturated, whereby the rate of delivery of said trigger pulses determines the frequency at which the average current in both directions through the meter will be equal.

8. A frequency meter circuit for measuring the frequency of a cyclic input signal, comprising a source of constant D.C. power; a meter; two impedances respectively connecting opposite ends of the meter to one side of the D.C. source; two electronic valves respectively connected in circuits between opposite ends of the meter and the other side of the D.C. source; means for normally biasing the two valves to different relative conditions of conductivity; a monostable oscillation circuit including valve means coupled with said two valves and connected to receive said cyclic input signal and be driven thereby to an astable state for the interval of a time-constant means which comprises part of said oscillation circuit; and control means connected between said oscillation circuit; and control means connected between said oscillation circuit and the other of said two valves for reversing said relative conditions of conductivity to thereby reverse the direction of current flow in the meter during each astable interval.

References Cited in the file of this patent
UNITED STATES PATENTS

| | | |
|---|---|---|
| 2,352,082 | De Rosa | June 20, 1944 |
| 2,446,527 | Chun et al. | Aug. 10, 1948 |
| 2,494,357 | Rogers | Jan. 10, 1950 |
| 2,499,953 | Herzog | Mar. 7, 1950 |
| 2,510,381 | Cushing | June 6, 1950 |
| 2,552,854 | Jacobs | May 15, 1951 |
| 2,562,697 | Clapp | July 31, 1951 |
| 2,720,584 | Sloughter | Oct. 11, 1955 |
| 2,830,265 | Ellison | Apr. 8, 1958 |
| 2,908,864 | Shepard | Oct. 13, 1959 |
| 2,936,382 | Goulding | May 10, 1960 |
| 2,941,096 | Gunkel | June 14, 1960 |
| 2,945,966 | Davenport | July 19, 1960 |

FOREIGN PATENTS

| | | |
|---|---|---|
| 1,148,072 | France | June 17, 1959 |

OTHER REFERENCES

"Transistor Frequency Meters" article in Electronic Engineering, August 1956; pages 322–327.

"Transistor Count-Rate Systems" article in Electrical Engineering, July 1958; pages 623–625.